United States Patent
Chiga et al.

(10) Patent No.: US 9,444,097 B2
(45) Date of Patent: Sep. 13, 2016

(54) POSITIVE ELECTRODE FOR NONAQUEOUS ELECTROLYTE SECONDARY BATTERY, METHOD FOR PRODUCING THE SAME, AND NONAQUEOUS ELECTROLYTE SECONDARY BATTERY

(71) Applicant: SANYO ELECTRIC CO., LTD, Moriguchi-shi, Osaka (JP)

(72) Inventors: Takanobu Chiga, Osaka (JP); Naoki Imachi, Hyogo (JP); Daisuke Kato, Kyoto (JP)

(73) Assignee: SANYO Electric Co., Ltd., Daito-shi, Osaka (JP)

(*) Notice: Subject to any disclaimer, the term of this patent is extended or adjusted under 35 U.S.C. 154(b) by 120 days.

(21) Appl. No.: 14/378,821

(22) PCT Filed: Feb. 4, 2013

(86) PCT No.: PCT/JP2013/052460
§ 371 (c)(1),
(2) Date: Aug. 14, 2014

(87) PCT Pub. No.: WO2013/129032
PCT Pub. Date: Sep. 6, 2013

(65) Prior Publication Data
US 2015/0030924 A1  Jan. 29, 2015

(30) Foreign Application Priority Data

Mar. 2, 2012 (JP) ................. 2012-046798

(51) Int. Cl.
| | | |
|---|---|---|
| *H01M 4/36* | (2006.01) | |
| *H01M 4/136* | (2010.01) | |
| *H01M 4/58* | (2010.01) | |
| *H01M 4/62* | (2006.01) | |
| *H01M 10/42* | (2006.01) | |
| *H01M 4/131* | (2010.01) | |
| *H01M 4/1391* | (2010.01) | |
| *H01M 10/0525* | (2010.01) | |
| *H01M 4/02* | (2006.01) | |

(52) U.S. Cl.
CPC ............. *H01M 4/364* (2013.01); *H01M 4/136* (2013.01); *H01M 4/58* (2013.01); *H01M 4/628* (2013.01); *H01M 10/4235* (2013.01); *H01M 4/131* (2013.01); *H01M 4/1391* (2013.01); *H01M 10/0525* (2013.01); *H01M 2004/028* (2013.01); *Y02P 70/54* (2015.11)

(58) Field of Classification Search
CPC .. H01M 4/364; H01M 4/131; H01M 4/1391; H01M 4/136; H01M 4/58; H01M 10/0525; H01M 10/4235; H01M 2004/028
See application file for complete search history.

(56) References Cited

U.S. PATENT DOCUMENTS

| | | |
|---|---|---|
| 8,012,625 B2 | 9/2011 | Yamamoto et al. |
| 2008/0032194 A1 | 2/2008 | Nakai et al. |
| 2010/0279165 A1* | 11/2010 | Lemmon ............... H01M 4/38 429/231.9 |

FOREIGN PATENT DOCUMENTS

| | | |
|---|---|---|
| JP | 09-306547 A | 11/1997 |
| JP | 11-273674 A | 10/1999 |
| JP | 2008-027778 A | 2/2008 |
| JP | 2008-123972 A | 5/2008 |
| JP | 2010-055777 A | 3/2010 |

OTHER PUBLICATIONS

International Search Report dated Mar. 19, 2013, issued in corresponding application No. PCT/JP2013/052460.

* cited by examiner

*Primary Examiner* — Laura Weiner
(74) *Attorney, Agent, or Firm* — Westerman, Hattori, Daniels & Adrian, LLP

(57) ABSTRACT

[Object] To provide a positive electrode for a nonaqueous electrolyte secondary battery with which characteristics of the nonaqueous electrolyte secondary battery, such as a charge/discharge efficiency, a capacity retention ratio, and a discharge capacity retention ratio are not easily degraded even in the case where the nonaqueous electrolyte secondary battery is continuously charged at a high temperature.

[Solution] A positive electrode 12 of a nonaqueous electrolyte secondary battery 1 includes a positive electrode active material layer 12*b*. The positive electrode active material layer 12*b* contains a positive electrode active material and a compound represented by a general formula (1): $MH_2PO_2$ (1). In the general formula (1), M represents a monovalent cation.

6 Claims, 1 Drawing Sheet

POSITIVE ELECTRODE FOR NONAQUEOUS ELECTROLYTE SECONDARY BATTERY, METHOD FOR PRODUCING THE SAME, AND NONAQUEOUS ELECTROLYTE SECONDARY BATTERY

TECHNICAL FIELD

The present invention relates to a positive electrode for a nonaqueous electrolyte secondary battery, a method for producing the same, and a nonaqueous electrolyte secondary battery.

BACKGROUND ART

Hitherto, nonaqueous electrolyte secondary batteries such as lithium secondary batteries have been widely used as power supplies of electronic devices and the like.

In recent years, the realization of high capacities for nonaqueous electrolyte secondary batteries has been desired. An example of a method for realizing a high capacity for a nonaqueous electrolyte secondary battery is to increase a charging voltage. For example, in the case where lithium cobalt oxide is used as a positive electrode active material of a nonaqueous electrolyte secondary battery, when the nonaqueous electrolyte secondary battery is charged up to 4.3 V on a metallic lithium basis, the capacity of the nonaqueous electrolyte secondary battery becomes about 160 mAh/g. On the other hand, when the nonaqueous electrolyte secondary battery is charged up to 4.5 V on a metallic lithium basis, the capacity of the nonaqueous electrolyte secondary battery becomes about 190 mAh/g.

An increase in the charging voltage of a nonaqueous electrolyte secondary battery may cause a problem in that a nonaqueous electrolyte is easily decomposed by the positive electrode active material. In particular, when a nonaqueous electrolyte secondary battery is charged at a high charging voltage at a high temperature, a nonaqueous electrolyte is more easily decomposed.

PTL 1 discloses a method for producing a positive electrode active material, the method including an adhesion step of allowing a phosphoric acid compound to adhere to compound oxide particles containing lithium and nickel, and a heating step of heat-treating the compound oxide particles to which the phosphoric acid compound is adhered. PTL 1 proposes that, for example, the charging current capacity of a secondary battery be increased by using the positive electrode active material produced by this method.

CITATION LIST

Patent Literature

PTL 1: Japanese Published Unexamined Patent Application No. 2010-55777

SUMMARY OF INVENTION

Technical Problem

In the case where the secondary battery disclosed in PTL 1 or the like is continuously charged at a high temperature, characteristics of the secondary battery, such as a charge/discharge efficiency, a capacity retention ratio, and a discharge capacity retention ratio may be degraded.

A main object of the present invention is to provide a positive electrode for a nonaqueous electrolyte secondary battery with which characteristics of the nonaqueous electrolyte secondary battery, such as a charge/discharge efficiency, a capacity retention ratio, and a discharge capacity retention ratio are not easily degraded even in the case where the nonaqueous electrolyte secondary battery is continuously charged at a high temperature.

Solution to Problem

A positive electrode for a nonaqueous electrolyte secondary battery according to the present invention includes a positive electrode active material layer. The positive electrode active material layer contains a positive electrode active material and a compound represented by a general formula (1): $MH_2PO_2$. In the general formula (1), M represents a monovalent cation.

A nonaqueous electrolyte secondary battery according to the present invention includes the positive electrode described above, a negative electrode, a nonaqueous electrolyte, and a separator.

A method for producing a positive electrode for a nonaqueous electrolyte secondary battery according to the present invention includes the steps of preparing a slurry for forming a positive electrode active material layer by mixing a compound represented by a general formula (1): $MH_2PO_2$, a positive electrode active material, and a solvent; and forming a positive electrode active material layer by applying the slurry for forming the positive electrode active material layer onto a positive electrode current collector and drying the slurry. In the general formula (1), M represents a monovalent cation.

Advantageous Effects of Invention

According to the present invention, it is possible to provide a positive electrode for a nonaqueous electrolyte secondary battery with which characteristics of the nonaqueous electrolyte secondary battery, such as a charge/discharge efficiency, a capacity retention ratio, and a discharge capacity retention ratio are not easily degraded even in the case where the nonaqueous electrolyte secondary battery is continuously charged at a high temperature.

DESCRIPTION OF EMBODIMENTS

Figure 1:
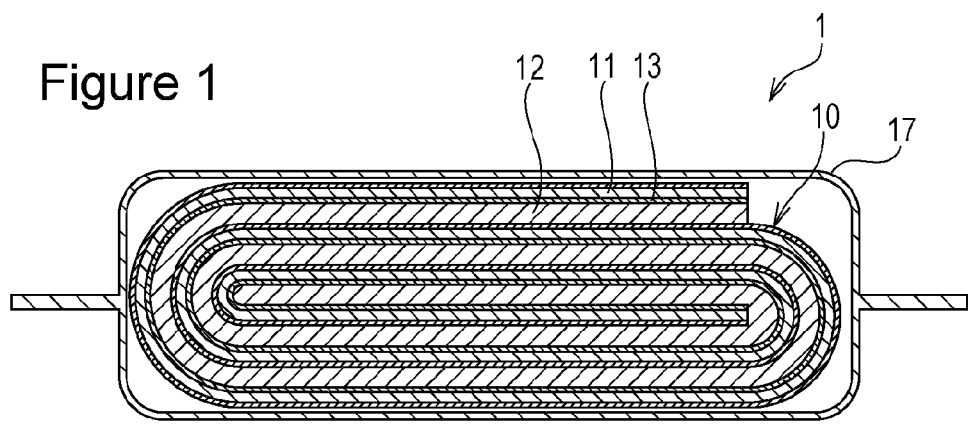
FIG. 1 is a schematic cross-sectional view of a nonaqueous electrolyte secondary battery according to an embodiment of the present invention.

An example of preferred embodiments that carry out the present invention will now be described. However, the embodiments described below are only illustrative. The present invention is not limited to the embodiments described below. Drawings that are referred in the embodiments are schematically drawn, and proportions of dimensions, etc. of an object drawn in the drawings may be different from proportions of dimensions, etc. of the real object. The proportions of dimensions, etc. of a specific object should be determined with consideration of the description below.

As illustrated in FIG. 1, a nonaqueous electrolyte secondary battery 1 includes a battery case 17. In the present embodiment, the battery case 17 has a flat form. However, in the present invention, the shape of the battery case is not limited to a flat form. The shape of the battery case may be, for example, a cylindrical shape, a rectangular shape, or the like.

An electrode assembly 10 impregnated with a nonaqueous electrolyte is housed in the battery case 17.

For example, known nonaqueous electrolytes can be used as the nonaqueous electrolyte. The nonaqueous electrolyte includes a solute, a nonaqueous solvent, etc.

Examples of the solute of the nonaqueous electrolyte include $LiPF_6$, $LiBF_4$, $LiCF_3SO_3$, $LiN(SO_2F)_2$, $LiN(SO_2CF_3)_2$, $LiN(SO_2C_2F_5)_2$, $LiC(SO_2CF_3)_3$, $LiC(SO_2C_2F_5)_3$, and $LiClO_4$. The nonaqueous electrolyte may include one solute or plural solutes.

Examples of the nonaqueous solvent of the nonaqueous electrolyte include cyclic carbonates, chain carbonates, and mixed solvents of a cyclic carbonate and a chain carbonate. Specific examples of the cyclic carbonates include ethylene carbonate, fluoroethylene carbonate, propylene carbonate, butylene carbonate, vinylene carbonate, and vinyl ethylene carbonate. Specific examples of the chain carbonates include dimethyl carbonate, methyl ethyl carbonate, and diethyl carbonate. A mixed solvent of a cyclic carbonate and a chain carbonate is preferably used as a nonaqueous solvent having a low viscosity, a low melting point, and a high lithium ion conductivity. In such a mixed solvent of a cyclic carbonate and a chain carbonate, a mixing ratio of the cyclic carbonate to the chain carbonate (cyclic carbonate:chain carbonate) is preferably in the range of 1:9 to 5:5 in terms of volume ratio.

The nonaqueous electrolyte may be, for example, a gel-like polymer electrolyte obtained by impregnating a polymer electrolyte composed of polyethylene oxide, polyacrylonitrile, or the like with an electrolyte solution.

The electrode assembly 10 is formed by winding a negative electrode 11, a positive electrode 12, and a separator 13 disposed between the negative electrode 11 and the positive electrode 12.

The separator 13 can suppress short-circuit due to the contact between the negative electrode 11 and the positive electrode 12 and is impregnated with a nonaqueous electrolyte. The separator 13 may include, for example, a resin porous film. Specific examples of the resin porous film include a polypropylene porous film, and polyethylene porous film, and a laminate of a polypropylene porous film and a polyethylene porous film.

The negative electrode 11 includes a negative electrode current collector and a negative electrode active material layer disposed on at least one surface of the negative electrode current collector. The negative electrode current collector may be constituted by a foil composed of a metal such as copper (Cu) or an alloy containing a metal such as Cu.

The negative electrode active material layer contains a negative electrode active material. The negative electrode active material is not particularly limited as long as the negative electrode active material can reversibly store and release lithium. Examples of the negative electrode active material include carbon materials such as graphite and coke; metal oxides such as tin oxide; metals that are alloyed with lithium and can store lithium, e.g., silicon and tin; and metallic lithium. Among these, carbon materials are preferable as the negative electrode active material because a change in the volume due to the storage and release of lithium is small and carbon materials have good reversibility.

The negative electrode active material layer may contain a carbon conductive agent such as graphite, a binder such as carboxymethyl cellulose sodium (CMC) or styrene-butadiene rubber (SBR), etc.

Figure 2:
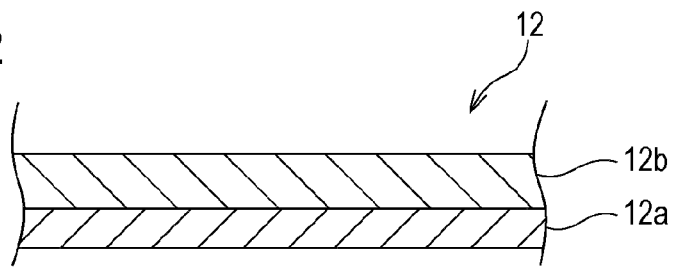
FIG. 2 is a schematic cross-sectional view of a positive electrode for a nonaqueous electrolyte secondary battery according to an embodiment of the present invention.

As illustrated in FIG. 2, the positive electrode 12 includes a positive electrode current collector 12a and a positive electrode active material layer 12b disposed on the positive electrode current collector 12a. The positive electrode current collector 12a may be constituted by a foil composed of a metal such as aluminum (Al) or an alloy containing a metal such as Al.

The positive electrode active material layer 12b contains a positive electrode active material. The positive electrode active material layer 12b may contain a binder, a conductive agent, etc. in addition to the positive electrode active material. Specific examples of the binder include polytetrafluoroethylene and polyvinylidene fluoride (PVDF). Specific examples of the conductive agent include carbon materials such as graphite, acetylene black, and carbon black. The positive electrode active material may be in the form of a particle.

The positive electrode active material is not particularly limited. The positive electrode active material is, for example, a lithium transition metal oxide. The lithium transition metal oxide preferably has a layer structure. Examples of the lithium transition metal oxide include lithium-nickel compound oxides, lithium-nickel-cobalt-aluminum compound oxides, lithium-nickel-cobalt-manganese compound oxides, and lithium-cobalt compound oxides. A lithium cobalt oxide in which at least one of aluminum (Al) and magnesium (Mg) is solid-dissolved in the crystal and zirconium (Zr) adheres to a surface is preferable as the lithium transition metal oxide because such a lithium cobalt oxide has high stability of the crystal structure. In the case where the lithium transition metal oxide contains nickel, the proportion of nickel in the lithium transition metal oxide is preferably 40% by mole or more from the viewpoint of reducing the amount of cobalt used. The positive electrode active material may be constituted by one substance or two or more substances.

The positive electrode active material layer 12b contains a compound (1) represented by a general formula (1) below:

$$MH_2PO_2 \qquad (1)$$

[In the Formula, M Represents a Monovalent Cation.]

In the compound (1), M is preferably at least one selected from the group consisting of $NH_4$, Na, Li, and K, and more preferably at least one of $NH_4$ and Na.

It is believed that the compound (1) functions as a reducing agent in the positive electrode active material layer 12b of the nonaqueous electrolyte secondary battery 1. Specifically, it is believed that the compound (1) is oxidized in the positive electrode active material layer 12b, thereby suppressing oxidation and decomposition of a nonaqueous electrolyte. When the decomposition of the nonaqueous electrolyte is suppressed, the amount of gas generated in the nonaqueous electrolyte secondary battery 1 is reduced and characteristics such as a capacity retention ratio and a charge/discharge efficiency are not easily degraded.

It is also believed that, in a process for producing a positive electrode described below, when a slurry for forming a positive electrode active material layer is applied onto a positive electrode current collector 12a and dried, part of the compound (1) reduces a transition metal in the positive electrode active material. As a result, the conductivity of the surface of the positive electrode active material is improved and a discharge capacity retention ratio of the nonaqueous electrolyte secondary battery 1 is increased.

The positive electrode 12 is produced, for example, as described below. First, a positive electrode active material, the compound (1), and a solvent are mixed to prepare a slurry for forming a positive electrode active material layer. For example, N-methyl-2-pyrrolidone (NMP) is preferably used as the solvent. The slurry for forming a positive electrode active material layer may further contain a conductive agent, a binder, etc. The order of mixing the positive electrode active material, the compound (1), the solvent, the conductive agent, the binder, etc. is not particularly limited. The compound (1) may be mixed in the form of a solid. Alternatively, the compound (1) may be mixed in the form of an aqueous solution. An aqueous solution containing the compound (1) may be sprayed onto the positive electrode active material.

Next, the slurry for forming a positive electrode active material layer is applied onto the positive electrode current collector 12a and dried to form the positive electrode active material layer 12b. The positive electrode 12 can be produced through the above steps.

In PTL 1, by heat-treating compound oxide particles to which a phosphoric acid compound is adhered, the phosphoric acid compound is decomposed. When the compound (1) is overheated at a temperature of about 200° C. or higher, the compound (1) is decomposed. However, when the compound (1) is decomposed in the nonaqueous electrolyte secondary battery 1, the effect of the compound (1) functioning as a reducing agent may be lost and the thickness of the battery may be increased.

In order not to thermally decompose the compound (1), the slurry for forming a positive electrode active material layer, the slurry containing the compound (1), is preferably dried at a temperature of 150° C. or lower, and more preferably at a temperature of 130° C. or lower.

Reaction formulae (I) to (IV) below are reaction formulae of thermal decomposition that is believed to be caused by overheating $NaH_2PO_2.H_2O$, $(NH_4)H_2PO_2$, $LiH_2PO_2$, or $KH_2PO_2$ to 200° C. or higher.

$$5NaH_2PO_2 \rightarrow Na_4P_2O_7 + NaPO_3 + 2PH_3 + 2H_2 \quad (I)$$

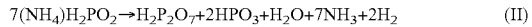

$$7(NH_4)H_2PO_2 \rightarrow H_2P_2O_7 + 2HPO_3 + H_2O + 7NH_3 + 2H_2 \quad (II)$$

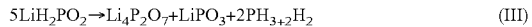

$$5LiH_2PO_2 \rightarrow Li_4P_2O_7 + LiPO_3 + 2PH_3 + 2H_2 \quad (III)$$

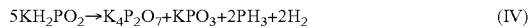

$$5KH_2PO_2 \rightarrow K_4P_2O_7 + KPO_3 + 2PH_3 + 2H_2 \quad (IV)$$

In the positive electrode active material layer 12b, the compound (1) is preferably contained in an amount of 0.001 parts by mass or more, more preferably 0.02 parts by mass or more, and still more preferably 0.04 parts by mass or more relative to 100 parts by mass of the positive electrode active material. This is because when the content of the compound (1) is excessively small, the effect of improving the charge/discharge efficiency of the nonaqueous electrolyte secondary battery 1 may not be sufficiently obtained.

In the positive electrode active material layer 12b, the compound (1) is preferably contained in an amount of 1.0 part by mass or less, more preferably 0.5 parts by mass or less, and still more preferably 0.2 parts by mass or less relative to 100 parts by mass of the positive electrode active material. When the content of the compound (1) is excessively large, the amount of gas generated in the nonaqueous electrolyte secondary battery 1 is easily increased and the thickness of the nonaqueous electrolyte secondary battery 1 may be easily increased.

The present invention will now be described in more detail using specific Examples. The present invention is not limited to the Examples described below and can be carried out by appropriately changing it within a range that does not change the gist of the present invention.

EXAMPLE 1

A positive electrode active material, acetylene black, and polyvinylidene fluoride (PVDF) were kneaded with NMP to prepare a slurry. A positive electrode active material prepared by mixing $LiCoO_2$ (in which Al and Mg were each solid-dissolved in an amount of 1.0% by mole, and 0.05% by mole of Zr adhered to a surface) and $LiNi_{1/3}CO_{1/3}Mn_{1/3}O_2$ in a mass ratio of 9:1 was used as the positive electrode active material. The mass ratio of the positive electrode active material, the acetylene black, and the PVDF was adjusted to 95:2.5:2.5. Next, a $NaH_2PO_2.H_2O$ powder obtained by grinding a raw material with a mortar and passing the ground raw material through a mesh having openings of 20 μm was prepared as an additive. Next, 0.1 parts by mass of this additive was added relative to 100 parts by mass of the positive electrode active material, and stirring was performed. Thus, a slurry for forming a positive electrode active material layer was prepared. The slurry for forming a positive electrode active material layer was applied onto both surfaces of an aluminum foil, and dried at 120° C. for three minutes. The resulting aluminum foil was then rolled to prepare a positive electrode. A filling density of the positive electrode was 3.8 g/mL.

[Preparation of Negative Electrode]

Graphite, styrene-butadiene rubber, and carboxymethyl cellulose were kneaded with water such that the mass ratio of the graphite, the styrene-butadiene rubber, and the carboxymethyl cellulose was 98:1:1. Thus, a negative electrode mixture slurry was prepared. This negative electrode mixture slurry was applied onto both surfaces of a copper foil, and dried. The resulting copper foil was then rolled to prepare a negative electrode.

[Preparation of Nonaqueous Electrolyte]

Ethylene carbonate (EC), ethyl methyl carbonate (EMC), and diethyl carbonate (DEC) were mixed in a volume ratio of 3:6:1. Next, $LiPF_6$ was added thereto such that the amount of $LiPF_6$ was 1.0 mol/L. Thus, a mixture was prepared. Subsequently, 2 parts by mass of vinylene carbonate was added relative to 100 parts by mass of this mixture to prepare a nonaqueous electrolyte.

[Assembly of Battery]

A lead terminal was attached to each of the positive electrode and the negative electrode prepared as described above. Next, the positive electrode and the negative electrode were arranged so as to face each other with a separator therebetween, and the positive electrode, the separator, and the negative electrode were wound in a spiral manner. The resulting wound assembly was flattened by pressing to prepare a flat-shaped electrode assembly. Next, the electrode assembly and the nonaqueous electrolyte were put in a battery case formed of an aluminum laminate, and the battery case was sealed. Thus, a battery A was prepared. A design capacity of the battery A was 800 mAh. The design capacity of the battery A was designed on the basis of an end-of-charge voltage when the battery A was charged up to a voltage of 4.4 V. The battery A had a size of 3.6 mm×35 mm×62 mm.

For the battery A, constant-current charging was performed at 0.5 lt (400 mA) up to a voltage of 4.4 V. Next, the battery A was charged at a constant voltage of 4.4 V up to a current of 40 mA, and then left to stand for 10 minutes. Next, for the battery A, constant-current discharging was performed at 0.5 lt (400 mA) down to a voltage of 2.75 V.

[60° C. Continuous Charging Storage Test]

For the battery A, charging and discharging were performed once at 1 lt (800 mA), and a discharge capacity $Q_o$ was measured. Next, the thickness of the battery A was measured. Next, the battery A was charged at a constant voltage of 4.4 V for 65 hours in a thermostatic chamber at 60° C. Next, the thickness of the battery A was measured, and the amount of increase in the battery thickness was determined. Subsequently, the battery A was cooled to room temperature. The battery A was then discharged at 1 lt (800 mA) at room temperature, and a discharge capacity $Q_1$ was measured. A capacity retention ratio (%) was calculated by a formula (A) below.

$$\text{Capacity retention ratio (\%)} = Q_1/Q_0 \times 100 \quad (A)$$

Next, for the battery A, charging and discharging were performed at 1 Lt (800 mA), and a charge capacity $Q_C$ and a discharge capacity $Q_D$ were measured. A charge/discharge efficiency (%) after a continuous charging storage test was calculated by a formula (B) below.

$$\text{Charge/discharge efficiency (\%) after continuous charging storage test} = Q_D/Q_C \times 100 \quad (B)$$

[Evaluation of Discharge Performance]

For the battery A, constant-current charging was performed at 0.5 lt (400 mA) up to a voltage of 4.4 V. Next, the battery A was charged at a constant voltage of 4.4 V up to a current of 40 mA, and then left to stand for 10 minutes. Next, for the battery A, constant-current discharging was performed at 1 lt (800 mA) down to a voltage of 2.75 V. A discharge capacity $Q_{1C}$ at 1 lt was measured.

Next, for the battery A, constant-current charging was performed at 0.5 lt (400 mA) up to a voltage of 4.4 V. Next, the battery A was charged at a constant voltage of 4.4 V up to a current of 40 mA, and then left to stand for 10 minutes. Next, for the battery A, constant-current discharging was performed at 3 lt (2,400 mA) down to a voltage of 2.75 V. A discharge capacity $Q_{3C}$ at 3 lt was measured. A discharge capacity retention ratio (%) was calculated by a formula (C) below, and the discharge performance was evaluated.

$$\text{Discharge capacity retention ratio (\%)} = Q_{3C}/Q_{1C} \times 100 \quad (C)$$

The characteristics of the battery A were evaluated as described above. The results are shown in Table 1.

EXAMPLE 2

A battery B was prepared as in the battery A except that $NH_4H_2PO_2$ was used as the additive instead of $NaH_2PO_2 \cdot H_2O$ in the preparation of the positive electrode. The characteristics of the battery B were evaluated. The results are shown in Table 1.

COMPARATIVE EXAMPLE 1

A battery C was prepared as in the battery A except that $NaH_2PO_2 \cdot H_2O$ was not used in the preparation of the positive electrode. The characteristics of the battery C were evaluated. The results are shown in Table 1.

COMPARATIVE EXAMPLE 2

A battery D was prepared as in the battery A except that $NaH_2PO_3 \cdot 5H_2O$ was used as the additive instead of $NaH_2PO_2 \cdot H_2O$ in the preparation of the positive electrode. The characteristics of the battery D were evaluated. The results are shown in Table 1.

COMPARATIVE EXAMPLE 3

A battery E was prepared as in the battery A except that $NaH_2PO_4$ was used as the additive instead of $NaH_2PO_2 \cdot H_2O$ in the preparation of the positive electrode. The characteristics of the battery E were evaluated. The results are shown in Table 1.

COMPARATIVE EXAMPLE 4

A battery F was prepared as in the battery A except that $NH_4H_2PO_4$ was used as the additive instead of $NaH_2PO_2 \cdot H_2O$ in the preparation of the positive electrode. The characteristics of the battery F were evaluated. The results are shown in Table 1.

COMPARATIVE EXAMPLE 5

A battery G was prepared as in the battery A except that $Li_3PO_4$ was used as the additive instead of $NaH_2PO_2 \cdot H_2O$ in the preparation of the positive electrode. The characteristics of the battery G were evaluated. The results are shown in Table 1.

TABLE 1

| | Additive | Content of additive (Parts by mass) | Amount of increase in battery thickness (mm) | Capacity retention ratio (%) | Charge/discharge efficiency (%) | Discharge capacity retention ratio (%) |
|---|---|---|---|---|---|---|
| Battery A | $NaH_2PO_2 \cdot H_2O$ | 0.1 | 0.57 | 91 | 101 | 70 |
| Battery B | $NH_4H_2PO_2$ | 0.1 | 0.34 | 92 | 100 | 73 |
| Battery C | Not contained | 0 | 1.66 | 87 | 87 | 66 |
| Battery D | $NaH_2PO_3 \cdot 5H_2O$ | 0.1 | 0.84 | 89 | 88 | 65 |
| Battery E | $NaH_2PO_4$ | 0.1 | 0.89 | 90 | 87 | 64 |
| Battery F | $NH_4H_2PO_4$ | 0.1 | 0.9 | 88 | 85 | 64 |
| Battery G | $Li_3PO_4$ | 0.1 | 1.49 | 87 | 88 | 65 |

As shown in Table 1, in the batteries A and B, the amounts of increase in the battery thickness were smaller than those in the batteries C to G. These results show that the amounts of gas generated in the batteries A and B were smaller than those in the batteries C to G.

In the batteries A and B, the capacity retention ratios were higher than those in the batteries C to G. It is believed that this is due to the fact that the amounts of gas generated in the batteries A and B were suppressed as compared with those in the batteries C to G.

The charge/discharge efficiencies of the batteries A and B were approximately 100%. The charge/discharge efficiencies of the batteries C to G were low. The reason for this is believed to be that a transition metal was eluted from the positive electrode and precipitated on the negative electrode, and micro short-circuiting was consequently caused.

[Measurement of Alternating Current Impedance]

Figure 3:
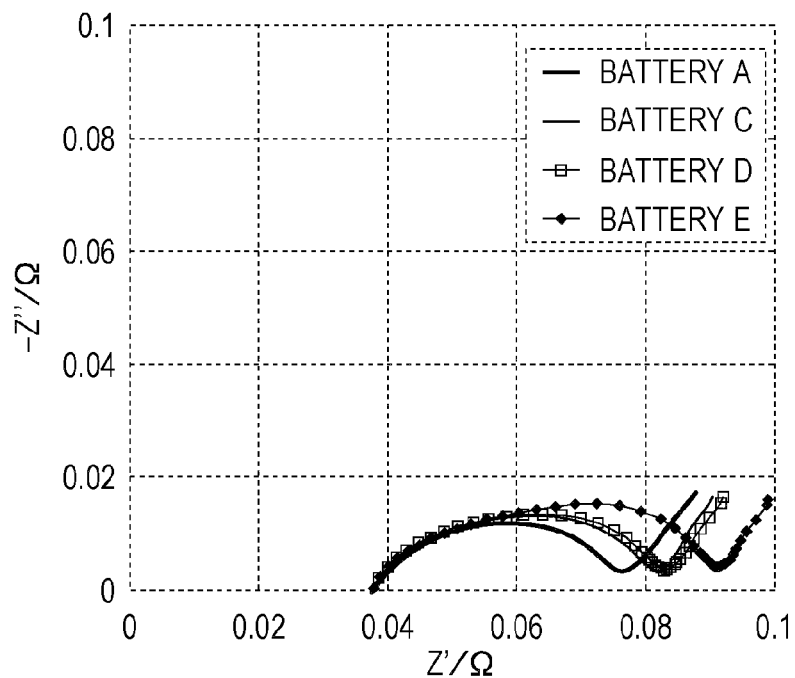
FIG. 3 is a graph showing alternating current impedance characteristics of a battery A and batteries C to E.

Before the 60° C. continuous charging storage test was performed, an alternating current impedance of each of the battery A and the batteries C to E was measured under the conditions below. The results are shown in FIG. 3. In the graph of FIG. 3, the horizontal axis represents the real part of the alternating current impedance, and the vertical axis represents the imaginary part of the alternating current impedance.

(Charging Condition)

For a battery, constant-current charging was performed at 1.0 It (800 mA) up to a voltage of 4.4 V. Next, the battery was charged at a constant voltage of 4.4 V up to 1/20 It (40 mA).

(Measurement Condition for Alternating Current Impedance)

The alternating current impedance of a battery was measured at an amplitude of 10 mV while the frequency was changed from 1 MHz to 30 MHz.

As shown in FIG. 3, in the battery A, in which the compound (1) represented by the general formula (1) was added, a decrease in the alternating current impedance was observed. It is believed that this is due to an improvement in the conductivity of a surface of the positive electrode active material. This result also corresponds to the result shown in Table 1 that the discharge capacity retention ratio of the battery A was improved as compared with those of the batteries C to G.

EXAMPLE 3

A battery H was prepared as in the battery A except that, in the preparation of the positive electrode, 0.02 parts by mass of the $NaH_2PO_2.H_2O$ powder was added relative to 100 parts by mass of the positive electrode active material. The characteristics of the battery H were evaluated. The results are shown in Table 2.

EXAMPLE 4

A battery I was prepared as in the battery A except that, in the preparation of the positive electrode, 0.05 parts by mass of the $NaH_2PO_2.H_2O$ powder was added relative to 100 parts by mass of the positive electrode active material. The characteristics of the battery I were evaluated. The results are shown in Table 2.

EXAMPLE 5

A battery J was prepared as in the battery A except that, in the preparation of the positive electrode, 0.2 parts by mass of the $NaH_2PO_2.H_2O$ powder was added relative to 100 parts by mass of the positive electrode active material. The characteristics of the battery J were evaluated. The results are shown in Table 2.

TABLE 2

| | Additive | Content of additive (Parts by mass) | Amount of increase in battery thickness (mm) | Capacity retention ratio (%) | Charge/discharge efficiency (%) | Discharge capacity retention ratio (%) |
|---|---|---|---|---|---|---|
| Battery H | $NaH_2PO_2 \cdot H_2O$ | 0.02 | 0.84 | 90 | 92 | 71 |
| Battery I | $NaH_2PO_2 \cdot H_2O$ | 0.05 | 0.84 | 90 | 101 | 70 |
| Battery A | $NaH_2PO_2 \cdot H_2O$ | 0.1 | 0.57 | 91 | 101 | 70 |
| Battery J | $NaH_2PO_2 \cdot H_2O$ | 0.2 | 1.34 | 90 | 101 | 73 |
| Battery C | Not contained | 0 | 1.66 | 87 | 87 | 66 |

The results shown in Table 2 show the following. When the content of the additive in the positive electrode active material is decreased, the charge/discharge efficiency decreases. When the content of the additive is increased, the battery thickness increases.

EXAMPLE 6

A battery K was prepared as in the battery A except that a slurry for forming a positive electrode active material layer was prepared as described below and used. In the preparation of the positive electrode, $NaH_2PO_2.H_2O$ was dissolved in water to prepare an aqueous solution. Next, while stirring the positive electrode active material used in the battery A, the above aqueous solution was added dropwise to the positive electrode active material. The $NaH_2PO_2$ was prepared such that the amount of $NaH_2PO_2$ mixed with the positive electrode active material was 0.1 parts by mass relative to 100 parts by mass of the positive electrode active material. The resulting mixture was then dried at 120° C. for two hours. The mixture was kneaded with acetylene black, polyvinylidene fluoride, and NMP. Thus, the slurry for forming a positive electrode active material layer was prepared. The characteristics of the battery K were evaluated. The results are shown in Table 3.

TABLE 3

| | Additive | Method of addition | Content of additive (Parts by mass) | Amount of increase in battery thickness (mm) | Capacity retention ratio (%) | Charge/ discharge efficiency (%) | Discharge capacity retention ratio (%) |
|---|---|---|---|---|---|---|---|
| Battery A | NaH$_2$PO$_2$•H$_2$O | Powder | 0.1 | 0.57 | 91 | 101 | 70 |
| Battery K | NaH$_2$PO$_2$•H$_2$O | Aqueous solution | 0.1 | 0.62 | 91 | 101 | 70 |

The results shown in Table 3 show that the characteristics of the batteries can be improved in both the cases where the compound (1) represented by the general formula (1) is mixed in the form of a powder and where the compound (1) represented by the general formula (1) is mixed in the form of an aqueous solution in the preparation of the positive electrode.

REFERENCE SIGNS LIST

1 . . . nonaqueous electrolyte secondary battery
10 . . . electrode assembly
11 . . . negative electrode
12 . . . positive electrode
12a . . . positive electrode current collector
12b . . . positive electrode active material layer
13 . . . separator
17 . . . battery case

The invention claimed is:

1. A positive electrode for a nonaqueous electrolyte secondary battery, the positive electrode comprising a positive electrode active material layer containing
a positive electrode active material comprising a lithium transition metal oxide, and
a compound represented by a general formula (1) below:

$$MH_2PO_2 \qquad (1)$$

wherein M in the compound represented by the general formula (1) is at least one selected from the group consisting of NH$_4$, Li, and K, and
wherein the compound represented by the general formula (1) is contained in an amount of 0.001 parts by mass or more and 1.0 parts by mass or less relative to 100 parts by mass of the positive electrode active material.

2. A nonaqueous electrolyte secondary battery comprising the positive electrode for a nonaqueous electrolyte secondary battery according to claim 1, a negative electrode, a nonaqueous electrolyte, and a separator.

3. A positive electrode for a nonaqueous electrolyte secondary battery, the positive electrode comprising a positive electrode active material layer containing
a positive electrode active material comprising a lithium transition metal oxide, and
a compound represented by a general formula (1) below:

$$MH_2PO_2 \qquad (1)$$

wherein M in the compound represented by the general formula (1) is at least one selected from the group consisting of NH$_4$, Na, Li, and K, and
wherein the compound represented by the general formula (1) is contained in an amount of 0.001 parts by mass or more and 1.0 part by mass or less relative to 100 parts by mass of the positive electrode active material.

4. A nonaqueous electrolyte secondary battery comprising the positive electrode for a nonaqueous electrolyte secondary battery according to claim 3,
a negative electrode containing a negative active material comprising a carbon material and
a nonaqueous electrolyte, and separator.

5. A lithium secondary battery comprising the positive electrode for a nonaqueous electrolyte secondary battery according to claim 3,
a negative electrode,
a nonaqueous electrolyte, and
a separator.

6. A lithium secondary battery comprising
a positive electrode,
a negative electrode,
a nonaqueous electrolyte, and
a separator,
wherein the positive electrode comprises a positive electrode active material layer containing a positive electrode active material comprising a lithium transition metal oxide, and
a compound represented by a general formula (1) below:

$$MH_2PO_2 \qquad (1)$$

wherein M in the compound represented by the general formula (1) is at least one selected from the group consisting of NH$_4$, Na, Li and K, and
wherein the compound represented by the general formula (1) is contained in an amount of 0.001 parts by mass or more and 1.0 part by mass or less relative to 100 parts by mass of the positive electrode active material.

\* \* \* \* \*